Patented Dec. 22, 1931

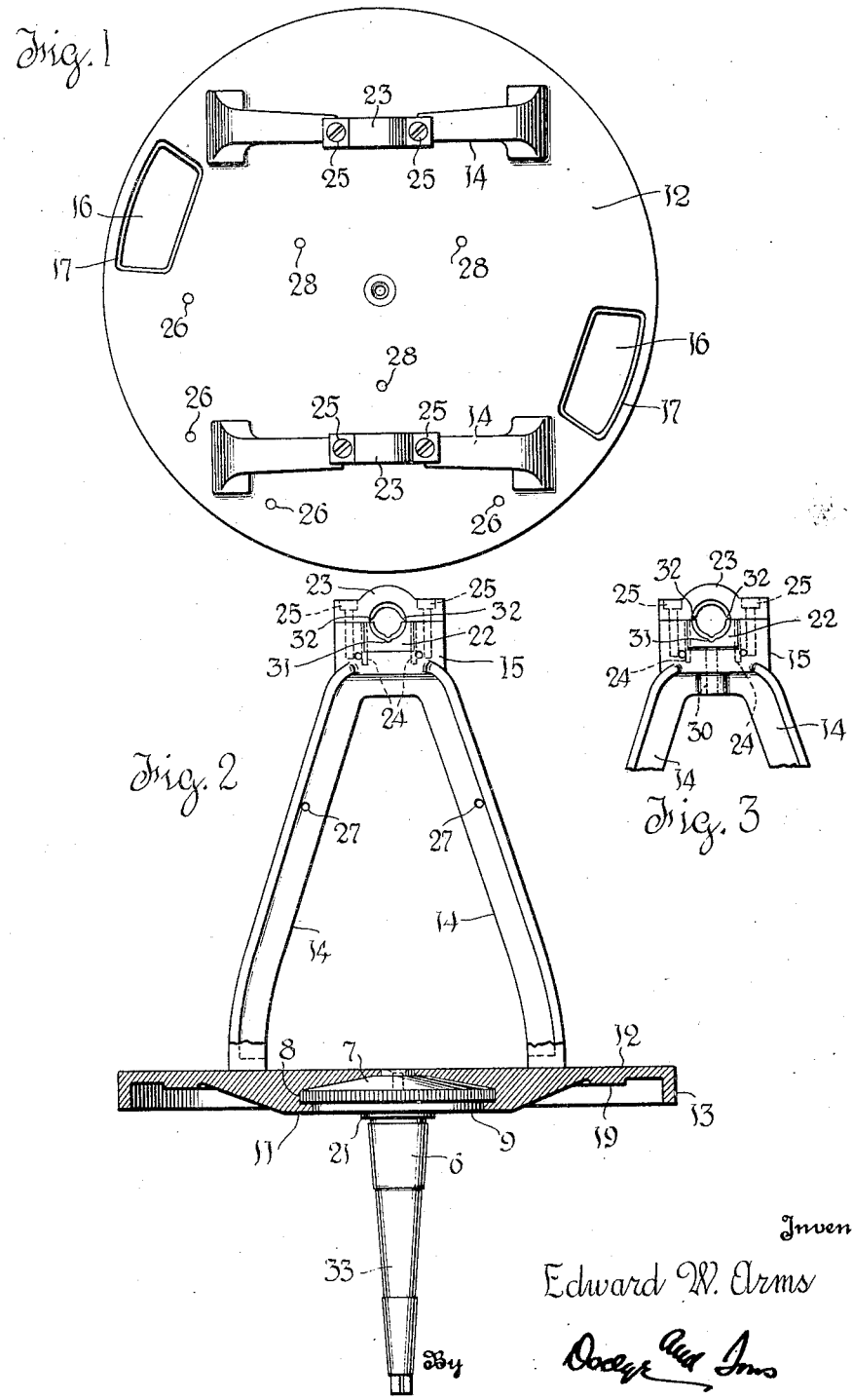

1,837,313

UNITED STATES PATENT OFFICE

EDWARD W. ARMS, OF TROY, NEW YORK, ASSIGNOR TO W. & L. E. GURLEY, OF TROY, NEW YORK, A CORPORATION OF NEW YORK

SURVEYING INSTRUMENT

Original application filed July 3, 1928, Serial No. 290,145. Divided and this application filed April 7, 1930. Serial No. 442,361.

This invention relates to geometrical instruments and particularly to frames for transits and other geometrical instruments having similar requirements.

The present application is a division of my prior application Serial No. 290,145 filed July 3, 1928, which disclosed and claimed the article here claimed, and also the method of manufacturing it. The parent application is now directed to the method of producing frames for geometrical instruments.

Frames for such instruments ordinarily include a base plate supported on a vertical spindle for orientation and standards on said plate on which the telescope is mounted. Usually the telescope is pivotally mounted on a horizontal axis which intersects the vertical axis.

In prior constructions the spindle is a separate piece from the base plate and the standards are also a separate piece or pieces. This sectional construction has heretofore been used in precision instruments such as these, partly to permit free selection of materials, and partly to permit adjustments and hand fitting regarded by instrument makers as essential to refined accuracy.

The present invention involves a radical departure in this respect. A unitary and virtually integral structure is adopted. All adjustments save one are eliminated. Reliance is placed on the precision of machine operations. Practical interchangeability is secured. The accuracy of the instrument initially is at least equal to that of the prior art instruments, and the maintained accuracy is superior because of the absence of fitted joints with their necessarily stressed connections.

Generally stated, the desired geometrical relations of the various axes of the instrument are determined by the machining operations, all of which are referred to the axis of the vertical spindle. More particularly this is accomplished by establishing countersinks by means of which the unitary frame is supported in a machine tool on the geometrical axis of the spindle, generating a surface of rotation (preferably temporary) about such axis, and thereafter positioning the piece for machining operations by engaging either the countersinks or said surface. If the locating surface be temporary, as preferred, a final operation is to mount the frame in the countersinks and machine the spindle to final form.

As above described, the invention is not limited to any particular type of unitary frame structure, but the best results now known are secured as follows:

A spindle blank with mushroom head is formed by countersinking its ends to define the fiducial axis and then turning it on centers to an accurate form in which the spindle portion alone is oversize. The material is advisably, but not necessarily, a forging of suitable aluminum alloy. This spindle blank is then mounted in a casting die of such form as to protect the oversize spindle and countersinks and accurately position the spindle blank while the base plate and standards are die cast in one piece on or around the mushroom head. By using a suitable aluminum alloy a virtually unitary piece can be secured including inserted spindle and die cast base plate, and standards, precisely formed and positioned relatively to one another.

Such a unitary frame is free of internal strains, and thus is superior in maintained accuracy to any sectional frame in which the connectors, and indeed to some degree all parts, are subject to continual stress. Moreover the frame is accurately symmetrical with reference to the axis of the insert which forms the spindle. The frame so made is machined by operations which preserve the original axis of the spindle insert as the axis of the entire frame. Thus the finished frame is symmetrical relatively to the spindle axis, and no disturbing effects incident to the use of diverse alloys occur.

In this way the original axis is preserved throughout and used in the final spindle-finishing operation. Proper design of fixtures makes it simple to ensure the accurate intersection of the spindle and trunnion axes or the spindle and telescope axes and the essential 90° relation thereof.

By proceeding as above set forth, the process being set forth in greater detail in the parent application, there is produced the frame here claimed.

The invention, as embodied in a transit frame, is illustrated in the accompanying drawings in which:

Fig. 1 is a plan view of the completed frame.

Fig. 2 is a view partly in vertical axial section.

Fig. 3 is a fragmentary view of the second trunnion bearing, i. e. the one not visible in Fig. 2.

The spindle 6 is produced from a blank of forged aluminum alloy, preferably a so-called "strong" aluminum alloy such as described in the patent to Archer and Jeffries, No. 1,472,739, granted October 30, 1923. Broadly stated the alloy is free from copper except as an impurity and contains magnesium and not less than 0.5% silicon, preferably about 1% of each of magnesium and silicon. (See the Archer and Jeffries patent, page 1, lines 29 to 35, and lines 49 to 54.) This alloy is quenched and artificially aged as described in the patent and is therefore in favorable condition for machining operations.

The blank is first turned with an over size spindle portion and an enlarged head whose form is clearly shown in Fig. 2. This includes a conical portion 7, a knurled or ribbed cylindrical rim 8 and a smaller cylindrical portion 9 whose lower face is flush with the lower face 11 of the base plate 12. The countersinks on which it is turned are preserved.

The oversized spindle portion then serves to position the blank in a casting die in which the base plate and telescope standards are cast upon the enlarged head.

Various different forms might be adopted for this enlarged head, that chosen being designed to offer several angles and a roughened peripheral surface, all of which are favorable to close engagement with the die casting formed around the head.

The two parts do not fuse together, but the shrink of the die cast metal is such as to produce a bond which will stand severe abuse. For example, the joint may be struck heavy blows with a machinist hammer while the frame is supported by clamping the spindle in a vise, without showing any tendency of the joint to fail. Blows which break out pieces of the base plate do not affect the bond between the forging and the die casting.

Generally stated, the alloy used for die casting is an aluminum base alloy containing as the main alloying constituent about 12% silicon. Iron is also present in small quantity but is regarded as an impurity, (see the patent to Jeffries and Archer No. 1,508,556, page 4, line 59 et seq. where the patentees state that the general class of alloys contains silicon in substantial amount, say from 3 to 15 per cent.) The alloy has, in the finished condition a tensile strength in the neighborhood of 34,000 pounds per square inch with an elongation of approximately 2½% and a Brinell hardness number of 80.

It will be observed that the die casting operation involves an incidental heating of the forging and that the properties of the forged alloy must be such as to entail no adverse effect resulting from such heating. While the preferred alloys have been stated, considerable latitude of choice is offered within the disclosure of the alloy patents above mentioned, and best results are secured by a careful coordination such as will ensure the use of two alloys, which considering the sizes and forms of the two parts, will in cooperation produce the desired result. It is quite possible that serviceable alloys not falling within the disclosures of said two patents may be found but the two specified have developed highly desirable characteristics in practice and are preferred.

The casting as it comes from the die includes the base plate 12 with pendant flange 13, the standards 14 and a connecting head 15 for each pair of standards. The openings 16 in the base plate have countersink margins 17 to receive cover glasses through which the verniers are viewed.

The casting is snagged and the vernier openings are finished to size and the centers defining the axis on which the spindle blank was originally turned are reestablished and used in turning a new tapered surface on the spindle. Thereafter this surface or the centers are used to position the frame in machining operations which include,—facing the lower portion of the base plate at 19 to receive the verniers; facing the inner side of flange 13; machining shoulder 21; facing the heads 15; slotting heads 15 to receive trunnion bearing blocks 22; mounting bearing caps 23 including drilling holes for pins 24 and screws 25; drilling, reaming and hobbing the trunnion bearings in blocks 22 and caps 23; and drilling a number of holes and tapping certain of them. These holes include, for example, those indicated at 26 for the level posts, at 27 for the vertical circle vernier, at 28 for the compass, and various others, as may be required by the design of the particular instrument.

As indicated in Fig. 3 one block 22 is vertically adjustable and the tapped hole 30 is formed to receive the adjusting screw.

In the final hobbing operation a relief is cut at 31 and later portions of the bearing in the cap are relieved at 32. The trunnion bearings are of the annularly grooved type for which no novelty is here claimed.

The final operation is to mount the frame on centers and turn and grind the spindle to finished dimensions. As finished there is a relief groove 33.

It will be observed that all the machining operations are referred to the axis of the spindle, and it follows that the accuracy of the finished product is dependent solely on the operative precision of the machine tools used in its production. The frame structure is unitary with the exception of the inserted bearing blocks, and the bearing caps which are used to secure satisfactory bearing metal at these points.

Attempts have heretofore been made to use aluminum in the frames of surveying instruments to secure lightness, but these failed, first because the aluminum zinc alloy used was soft, weak and subject to spontaneous disintegration, and second, because the sectional construction used exaggerated the inherent defects of the material.

The strong alloys used according to the present invention have physical properties far superior to those of the bronzes and brasses customarily used in surveying instruments; they do not warp as do some bronzes, they can be satisfactorily machined, and they are light in weight. The unitary construction and heat treatment produce a frame relieved of all internal stresses, such as are inevitably present in sectional frames. The method of machining ensures precise accuracy, ensures symmetry of the cast portion relatively to the forged insert, and permits the elimination of various adjustments formerly necessary to correct errors inherent in any sectional construction. The result is strength, simplicity, lightness and maintained accuracy in a degree never before approached.

What is claimed is,—

1. A frame for geometrical instruments of the light ray type, comprising a spindle composed of mechanically worked and refined metal and a frame of cast metal permanently united with said spindle in the casting operation.

2. A frame for geometrical instruments of the light ray type, comprising a spindle of mechanically worked aluminum-base alloy, and a head of cast aluminum-base alloy permanently united therewith by the casting operation.

3. A frame for geometrical instruments of the light ray type, including a spindle formed of a mechanically worked, quenched and artificially aged aluminum-base alloy free from copper except as an impurity, and containing magnesium and not less than 0.5% silicon, and a head of a different aluminum-base-alloy permanently united therewith.

4. A transit frame, comprising in a single piece, the vertical spindle, base plate, and telescope standards, the metallic structure of the spindle, as contradistinguished from substantially the remainder of the frame, being refined by mechanical working and heat treatment.

5. A transit frame, comprising in a single piece, the vertical spindle, base plate and telescope standards, the spindle, on the one hand, and substantially the remainder of the frame, on the other hand, being composed of diverse aluminum base alloys permanently united.

In testimony whereof I have signed my name to this specification.

EDWARD W. ARMS.